United States Patent
Karpin et al.

(10) Patent No.: US 9,019,226 B2
(45) Date of Patent: Apr. 28, 2015

(54) CAPACITANCE SCANNING PROXIMITY DETECTION

(71) Applicants: Oleksandr Karpin, Lviv (UA); Andriy Maharyta, Lviv (UA); Andriy Ryshtun, Lviv (UA); Victor Kremin, Lviv (UA); Volodymyr Hutnyk, Rohatyn District (UA)

(72) Inventors: Oleksandr Karpin, Lviv (UA); Andriy Maharyta, Lviv (UA); Andriy Ryshtun, Lviv (UA); Victor Kremin, Lviv (UA); Volodymyr Hutnyk, Rohatyn District (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/044,387

(22) Filed: Oct. 2, 2013

(65) Prior Publication Data

US 2014/0035871 A1    Feb. 6, 2014

Related U.S. Application Data

(63) Continuation of application No. 13/183,263, filed on Jul. 14, 2011.

(60) Provisional application No. 61/376,161, filed on Aug. 23, 2010.

(51) Int. Cl.
  *G06F 3/041* (2006.01)
  *G06F 3/044* (2006.01)

(52) U.S. Cl.
  CPC .............. *G06F 3/044* (2013.01); *G06F 3/0416* (2013.01); *G06F 2203/04108* (2013.01)

(58) Field of Classification Search
  CPC ................ G06F 3/044; G06F 3/0416; G06F 2203/04808; G06F 3/045; G06F 3/0485
  USPC ................................ 345/173–174; 178/18.06
  See application file for complete search history.

(56) References Cited

U.S. PATENT DOCUMENTS

| | | |
|---|---|---|
| 5,386,584 A | 1/1995 | Verstegen et al. |
| 5,412,387 A | 5/1995 | Vincelette et al. |
| 5,495,077 A | 2/1996 | Miller et al. |
| 5,642,134 A | 6/1997 | Ikeda |
| 5,825,352 A | 10/1998 | Bisset et al. |
| 5,841,078 A | 11/1998 | Miller et al. |
| 5,872,561 A | 2/1999 | Figie et al. |

(Continued)

FOREIGN PATENT DOCUMENTS

| | | |
|---|---|---|
| JP | 2001296963 A | 10/2001 |
| KR | 20100008704 A | 1/2010 |
| KR | 20100012352 A | 2/2010 |

OTHER PUBLICATIONS

USPTO Advisory Action for U.S. Appl. No. 13/183,263 dated Sep. 19, 2013; 3 pages.

(Continued)

*Primary Examiner* — Lun-Yi Lao
*Assistant Examiner* — Peter D McLoone

(57) ABSTRACT

A method and apparatus for scanning a first set of electrodes of a capacitive sense array using a first sensing mode to identify a presence of an object in proximity to the capacitive sense array, where scanning using the first sensing mode identifies objects not in physical contact with the capacitive sense array. The first set of electrodes is scanned using a second sensing mode to determine a location of the object in relation to the capacitive sense array, where rescanning using the second sensing mode determines locations of objects in physical contact with the capacitive sense array.

20 Claims, 7 Drawing Sheets

(56) References Cited

U.S. PATENT DOCUMENTS

| | | | |
|---|---|---|---|
| 6,504,530 B1 | 1/2003 | Wilson et al. | |
| 6,720,777 B2 | 4/2004 | Wang | |
| 7,036,096 B1 | 4/2006 | Sarkar et al. | |
| 7,301,350 B2 | 11/2007 | Hargreaves et al. | |
| 7,428,191 B1 | 9/2008 | Klein | |
| 7,653,883 B2* | 1/2010 | Hotelling et al. | 715/863 |
| 7,663,607 B2 | 2/2010 | Hotelling et al. | |
| 7,703,057 B2* | 4/2010 | Lenahan | 716/106 |
| 7,982,723 B2 | 7/2011 | Ningrat | |
| 8,054,300 B2* | 11/2011 | Bernstein | 345/174 |
| 8,115,499 B2* | 2/2012 | Osoinach et al. | 324/686 |
| 8,358,142 B2* | 1/2013 | Maharyta | 324/658 |
| 8,372,726 B2 | 2/2013 | Graff et al. | |
| 8,390,597 B2* | 3/2013 | Bernstein | 345/174 |
| 8,441,462 B2 | 5/2013 | Kobayashi et al. | |
| 8,508,495 B2* | 8/2013 | Hotelling et al. | 345/174 |
| 8,519,975 B2* | 8/2013 | Huang et al. | 345/174 |
| 8,547,360 B2* | 10/2013 | Posamentier | 345/174 |
| 8,570,052 B1* | 10/2013 | Mahartya | 324/658 |
| 8,614,693 B2* | 12/2013 | King et al. | 345/174 |
| 8,624,870 B2* | 1/2014 | Joharapurkar et al. | 345/174 |
| 8,692,563 B1* | 4/2014 | Maharyta | 324/658 |
| 8,723,825 B2* | 5/2014 | Wright et al. | 345/173 |
| 8,723,827 B2* | 5/2014 | Wright et al. | 345/173 |
| 8,743,087 B2* | 6/2014 | Hotelling et al. | 345/174 |
| 2003/0058053 A1 | 3/2003 | Jeon et al. | |
| 2003/0184065 A1 | 10/2003 | Breed et al. | |
| 2003/0209893 A1 | 11/2003 | Breed et al. | |
| 2004/0039298 A1 | 2/2004 | Abreu | |
| 2004/0047110 A1 | 3/2004 | Friederich et al. | |
| 2004/0129478 A1 | 7/2004 | Breed et al. | |
| 2004/0173028 A1 | 9/2004 | Rix | |
| 2004/0209591 A1 | 10/2004 | Martin et al. | |
| 2006/0161871 A1* | 7/2006 | Hotelling et al. | 715/863 |
| 2006/0227115 A1 | 10/2006 | Fry | |
| 2006/0256090 A1 | 11/2006 | Huppi | |
| 2006/0273804 A1 | 12/2006 | Delorme et al. | |
| 2007/0046299 A1 | 3/2007 | Hargreaves et al. | |
| 2007/0143667 A1 | 6/2007 | Deaton et al. | |
| 2007/0152977 A1 | 7/2007 | Ng et al. | |
| 2007/0229468 A1 | 10/2007 | Peng et al. | |
| 2008/0007533 A1 | 1/2008 | Hotelling | |
| 2008/0018614 A1 | 1/2008 | Rekimoto | |
| 2008/0048997 A1 | 2/2008 | Gillespie et al. | |
| 2008/0062148 A1 | 3/2008 | Hotelling et al. | |
| 2008/0072192 A1* | 3/2008 | Lenahan | 716/5 |
| 2008/0136792 A1 | 6/2008 | Peng et al. | |
| 2008/0150906 A1 | 6/2008 | Grivna | |
| 2008/0158146 A1 | 7/2008 | Westerman | |
| 2008/0158174 A1 | 7/2008 | Land et al. | |
| 2008/0158177 A1 | 7/2008 | Wilson et al. | |
| 2008/0158182 A1 | 7/2008 | Westerman | |
| 2008/0180399 A1 | 7/2008 | Cheng | |
| 2008/0309623 A1 | 12/2008 | Hotelling et al. | |
| 2008/0309634 A1 | 12/2008 | Hotelling et al. | |
| 2008/0316182 A1* | 12/2008 | Antila et al. | 345/173 |
| 2009/0009485 A1 | 1/2009 | Bytheway | |
| 2009/0058687 A1 | 3/2009 | Rothkopf et al. | |
| 2009/0073140 A1 | 3/2009 | Fujita et al. | |
| 2009/0096757 A1 | 4/2009 | Hotelling et al. | |
| 2009/0128516 A1 | 5/2009 | Rimon et al. | |
| 2009/0160787 A1 | 6/2009 | Westerman et al. | |
| 2009/0174676 A1 | 7/2009 | Westerman | |
| 2009/0273579 A1* | 11/2009 | Zachut et al. | 345/174 |
| 2009/0284495 A1 | 11/2009 | Geaghan et al. | |
| 2009/0309851 A1* | 12/2009 | Bernstein | 345/174 |
| 2009/0322351 A1 | 12/2009 | McLeod | |
| 2010/0001973 A1* | 1/2010 | Hotelling et al. | 345/174 |
| 2010/0007631 A1 | 1/2010 | Chang | |
| 2010/0039405 A1 | 2/2010 | Chen et al. | |
| 2010/0060608 A1 | 3/2010 | Yousefpor | |
| 2010/0066567 A1 | 3/2010 | Dietz et al. | |
| 2010/0073301 A1 | 3/2010 | Yousefpor et al. | |
| 2010/0073318 A1 | 3/2010 | Hu et al. | |
| 2010/0097328 A1 | 4/2010 | Simmons et al. | |
| 2010/0117981 A1 | 5/2010 | Chen et al. | |
| 2010/0164889 A1* | 7/2010 | Hristov et al. | 345/173 |
| 2010/0194697 A1 | 8/2010 | Hotelling et al. | |
| 2010/0194699 A1 | 8/2010 | Chang | |
| 2010/0245286 A1* | 9/2010 | Parker | 345/174 |
| 2010/0295559 A1* | 11/2010 | Osoinach | 324/658 |
| 2010/0328262 A1* | 12/2010 | Huang et al. | 345/174 |
| 2011/0005977 A1 | 1/2011 | Maggio | |
| 2011/0025629 A1* | 2/2011 | Grivna et al. | 345/173 |
| 2011/0025631 A1* | 2/2011 | Han | 345/173 |
| 2011/0026519 A1 | 2/2011 | Sullam et al. | |
| 2011/0037722 A1 | 2/2011 | Tseng et al. | |
| 2011/0122089 A1 | 5/2011 | Kobayashi et al. | |
| 2011/0133815 A1 | 6/2011 | Caldwell et al. | |
| 2011/0234523 A1* | 9/2011 | Chang et al. | 345/173 |
| 2011/0261006 A1* | 10/2011 | Joharapurkar et al. | 345/174 |
| 2012/0043971 A1* | 2/2012 | Maharyta | 324/658 |
| 2012/0043973 A1 | 2/2012 | Kremin | |
| 2012/0050210 A1* | 3/2012 | King et al. | 345/174 |
| 2012/0050216 A1 | 3/2012 | Kremin et al. | |
| 2012/0050333 A1* | 3/2012 | Bernstein | 345/660 |
| 2012/0154324 A1* | 6/2012 | Wright et al. | 345/174 |
| 2012/0200307 A1 | 8/2012 | Maharyta et al. | |
| 2012/0262406 A1 | 10/2012 | Hotelling et al. | |
| 2013/0009906 A1 | 1/2013 | Posamentier | |
| 2013/0100071 A1* | 4/2013 | Wright et al. | 345/174 |
| 2013/0278447 A1 | 10/2013 | Kremin | |
| 2013/0293513 A1* | 11/2013 | Hotelling et al. | 345/174 |
| 2013/0307823 A1* | 11/2013 | Grivna et al. | 345/174 |
| 2013/0314109 A1 | 11/2013 | Kremin et al. | |

OTHER PUBLICATIONS

USPTO Final Rejection for U.S. Appl. No. 13/183,263 dated Jul. 17, 2013; 14 pages.
USPTO Non-Final Rejection for U.S. Appl. No. 13/183,263 dated Apr. 11, 2013; 14 pages.
USPTO Non-Final Rejection for U.S. Appl. No. 13/183,263 dated Nov. 7, 2013; 13 pages.
U.S. Appl. No. 13/183,263 "Capacitance Scanning Promiximity Detection," Oleksadr Karpin, filed Jul. 14, 2011; 33 pages.
U.S. Appl. No. 13/360,296 "Multiplexer for a TX/RX Capacitance Sensing Panel" Edward Grivna et al., filed Jan. 27, 2012; 101 pages.
U.S. Appl. No. 14/222,227 "Input/Output Multiplexer Bus" Dennis R Seguine et al., filed Mar. 21, 2014; 32 pages.
International Search Report for International Application No. PCT/US11/38056 dated Jan. 2, 2012; 3 pages.
USPTO Advisory Action for U.S. Appl. No. 13/183,263 dated Apr. 24, 2014; 3 pages.
USPTO Advisory Action for U.S. Appl. No. 13/591,145 dated Jun. 13, 2013; 3 pages.
USPTO Advisory Action for U.S. Appl. No. 13/591,145 dated Jul. 9, 2013; 3 pages.
USPTO Advisory Action for U.S. Appl. No. 13/591,145 dated Dec. 6, 2013; 3 pages.
USPTO Advisory Action for U.S. Appl. No. 13/720,861 dated Sep. 18, 2013; 3 pages.
USPTO Final Rejection for U.S. Appl. No. 13/183,263 dated Feb. 12, 2014; 16 pages.
USPTO Final Rejection for U.S. Appl. No. 13/591,145 dated Apr. 3, 2013; 17 pages.
USPTO Final Rejection for U.S. Appl. No. 13/591,145 dated Oct. 3, 2013; 16 pages.
USPTO Final Rejection for U.S. Appl. No. 13/720,861 dated May 14, 2013; 7 pages.
USPTO Final Rejection for U.S. Appl. No. 13/720,861 dated Aug. 2, 2013; 9 pages.
USPTO Non Final Rejection for U.S. Appl. No. 13/917,528 dated Nov. 15, 2013; 12 pages.
USPTO Non-Final Rejection for U.S. Appl. No. 13/183,263 dated May 27, 2014; 14 pages.
USPTO Non-Final Rejection for U.S. Appl. No. 13/591,145 dated Aug. 12, 2013; 16 pages.
USPTO Non-Final Rejection for U.S. Appl. No. 13/591,145 dated Oct. 17, 2012; 16 pages.

(56) References Cited

OTHER PUBLICATIONS

USPTO Non-Final Rejection for U.S. Appl. No. 13/720,861 dated Mar. 11, 2013; 9 pages.
USPTO Notice of Allowance for U.S. Appl. No. 13/591,145 dated Jan. 6, 2014; 9 pages.
USPTO Notice of Allowance for U.S. Appl. No. 13/664,421 dated Feb. 21, 2013; 7 pages.
USPTO Notice of Allowance for U.S. Appl. No. 13/720,861 dated Dec. 3, 2013; 13 pages.
USPTO Notice of Allowance for U.S. Appl. No. 13/917,528 dated Apr. 16, 2014; 8 pages.
Written Opinion of the International Searching Authority for International Application No. PCT/US11/38056 dated Jan. 2, 2012; 5 pages.
USPTO Final Rejection for U.S. Appl. No. 13/183,263 dated Sep. 8, 2014; 15 pages.
USPTO Non Final Rejection for U.S. Appl. No. 14/275,387 dated Sep. 22, 2014; 15 pages.
U.S. Appl. No. 14/325,582: "Waterproof Scanning of a Capacitance Sense Array" Michael Patrick Hills et al., filed Jul. 8, 2014; 41 pages.
USPTO Advisory Action for U.S. Appl. No. 13/183,263 dated Nov. 19, 2014; 3 pages.
USPTO Non-Final Rejection for U.S. Appl. No. 13/183,263 dated Dec. 17, 2014; 15 pages.

* cited by examiner

CAPACITANCE SCANNING PROXIMITY DETECTION

RELATED APPLICATIONS

This application is a continuation of U.S. Non-provisional application Ser. No. 13/183,263 filed on Jul. 14, 2011, which claims the benefit of U.S. Provisional Application No. 61/376,161 filed on Aug. 23, 2010, in which the contents of each are hereby incorporated by reference herein in its entirety.

TECHNICAL FIELD

This disclosure relates to the field of touch-sensor devices and, in particular, to capacitance sensing proximity detection.

BACKGROUND

Computing devices, such as notebook computers, personal data assistants (PDAs), mobile communication devices, portable entertainment devices (such as handheld video game devices, multimedia players, and the like) and set-top-boxes (such as digital cable boxes, digital video disc (DVD) players, and the like) have user interface devices, which are also known as human interface devices (HID), that facilitate interaction between the user and the computing device. One type of user interface device that has become more common is a touch-sensor device that operates by way of capacitance sensing. A touch-sensor device usually is in the form of a touch-sensor pad, a touch-sensor slider, or touch-sensor buttons, and includes an array of one or more capacitive sense elements. The capacitance detected by a capacitance sensor changes when a touch object makes contact with the sensor. The touch object can be, for example, a stylus or a user's finger.

One type of capacitance sensing device includes multiple touch sense electrodes arranged in rows and columns and forming an array of intersections. At each intersection of the electrodes in the X and Y dimensions (i.e., a location where the approximately orthogonal electrodes cross over, but do not connect with, one another), a mutual capacitance is formed between the electrodes thus forming a matrix of capacitive sense elements. This mutual capacitance is measured by a processing system and any change in capacitance (e.g., due to the contact or movement of a touch object) can be detected. In a touch-sensor device, a change in capacitance detected by each sense element in the X and Y dimensions of the sense array can be measured by a variety of methods. Regardless of the method, usually an electrical signal representative of the capacitance detected by the capacitive sense elements is processed by a processing device, which in turn produces electrical or optical signals representative of the position of the touch object in relation to the touch-sensor pad in the X and Y dimensions. A touch-sensor strip, slider, or button operates on the same capacitance-sensing principle.

Certain computing devices may also process user input based on the proximity of an object to the device, rather than actual touch. For example, the touch-screen of a mobile phone may be deactivated when it is placed near a user's face to prevent touch-input commands from being entered due to inadvertent contact. Additionally, other computing devices may recognize gestures performed with the user's hand when it is near the computing device. For example, swiping a hand near the screen of an electronic reader may turn the page of an e-book either forwards or backwards. These proximity controls and gestures may be implemented using infrared (IR) technology. The computing device may include an IR transmitter which emits an IR signal. When an object (e.g., the user's hand) is near the device, some portion of the IR signal may be reflected back to the device and detected by an IR receiver. A processing device interprets the received signal to determine the presence and/or position of an object. The device can then perform an appropriate action based on the proximity or gesture detected. This technique, however, makes use of a dedicated IR sensor and associated chips for processing. At least four IR sensors would be used to detect even the simplest gestures. This may increase the overall cost of the computing device. In addition, the IR sensors may be sensitive to external IR fields, which could lead to saturation and negatively affect operation of the device.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to detect the proximity of an object using a capacitive sense array. In one embodiment, the capacitive sense array includes a plurality of electrodes arranged in rows and columns. In one embodiment, the outermost row and column electrodes form proximity scanning regions. A processing system scans the electrodes in the proximity scanning regions using a self-capacitance single electrode sensing technique to detect the presence of an object in proximity to the array. The processing system may use the same electrodes, but different sensing techniques to determine the location and/or movement (e.g., a gesture) of the object both when the object is and is not in physical contact with the capacitive sense array.

Figure 1:
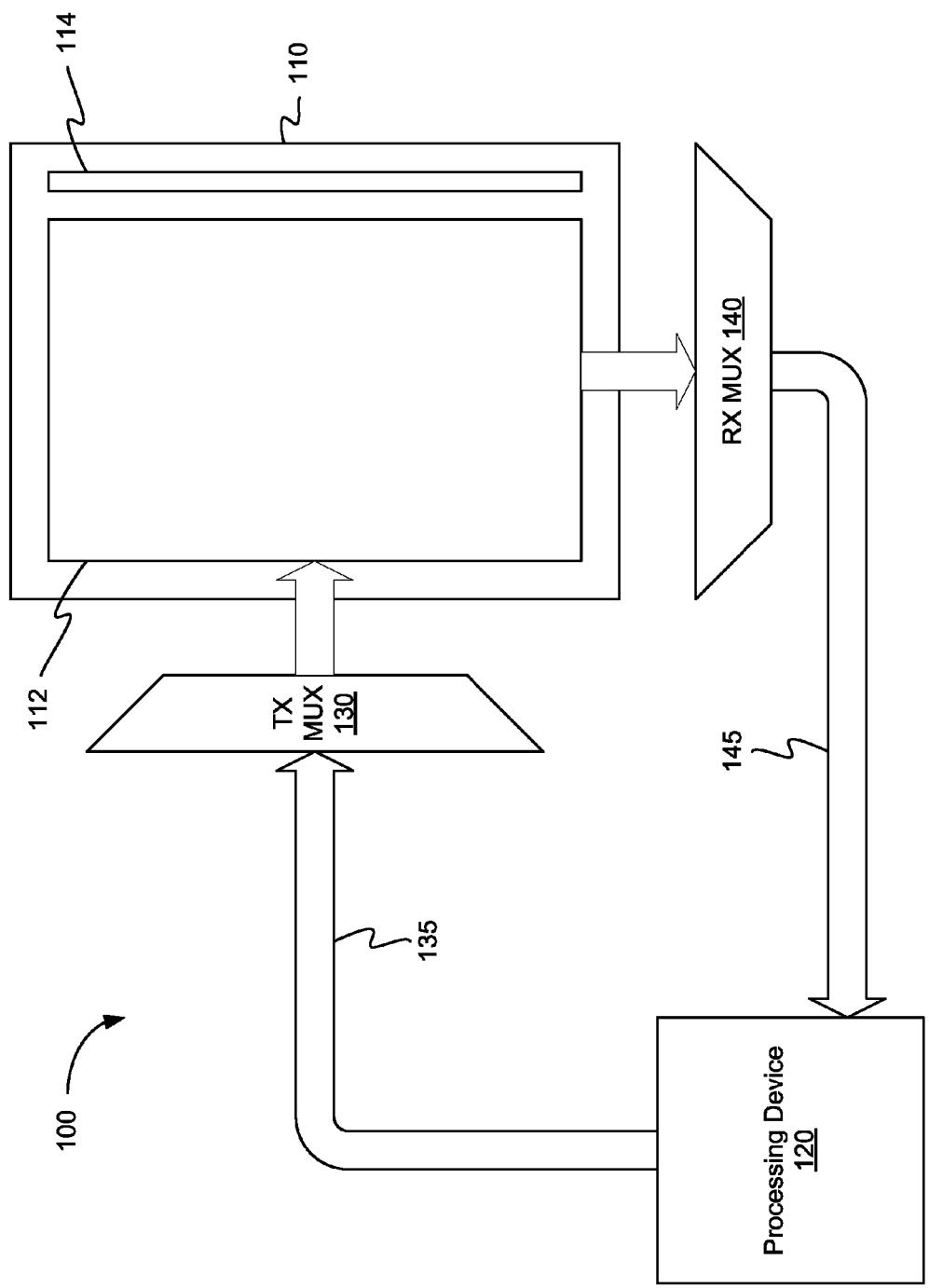
FIG. 1 is a block diagram illustrating a capacitance sensing system for proximity sensing, according to an embodiment.

FIG. 1 is a block diagram illustrating a capacitance sensing system, according to an embodiment of the present invention. In one embodiment, system 100 includes touch-sensing device 110, processing device 120, and multiplexers 130, 140. Touch-sensing device 110 may be, for example, a touch-sensor pad, a touch-screen display, a touch-sensor slider, a touch-sensor button, or other device. Touch-sensing device 110 may include capacitive sense array 112. Capacitive sense array 112 may include a matrix of sense elements arranged in rows and columns (e.g., in the X and Y dimensions) that can be used to detect the proximity or touch of a touch object (e.g., a user's finger). In one embodiment, capacitive sense array 112 uses a mutual capacitance sensing technique, where a mutual capacitance present at the intersection of two electrodes can be measured by processing device 120. The change in this mutual capacitance at one or more intersections allows processing device 120 to determine the location of the touch object.

With mutual capacitance sensing, one set of electrodes (e.g., the rows oriented in the X dimension) are designated as transmit (TX) electrodes. The transmit electrodes are driven with an electronic signal 135 provided by processing device 120. In one embodiment, transmit multiplexer (TX MUX) 130 may be used to apply the electronic signal 135 to one or more of the transmit electrodes. Another set of electrodes (e.g., the columns oriented in the Y dimension) are designated as receive (RX) electrodes. The mutual capacitance between the rows and columns may be measured by sampling a signal on each of the receive electrodes. In one embodiment, receive multiplexer (RX MUX) 140 may be used to sample the signal on one or more of the receive electrodes and provide the receive measurement signal 145 back to processing device 120. The designation of rows and columns as transmit and receive electrodes is merely one example, and in other embodiments, the rows and columns may be reversed.

In one embodiment, touch-sensor device 110 may further include proximity sensing antenna 114. Proximity sensing antenna 114 may include, for example, one or more wires (e.g., sensors or electrodes) that can detect the proximity of an object (e.g., a user's hand) to touch-sensor device 110. In this embodiment, proximity sensing antenna 114 is embedded in a frame of touch-sensor device 110, adjacent to capacitive sense array 112. As will be described below, however, proximity sensing antenna 114 may be oriented in any number of different ways with respect to capacitive sense array 112, including as part of the electrodes that form capacitive sense array 112.

Figure 2A:
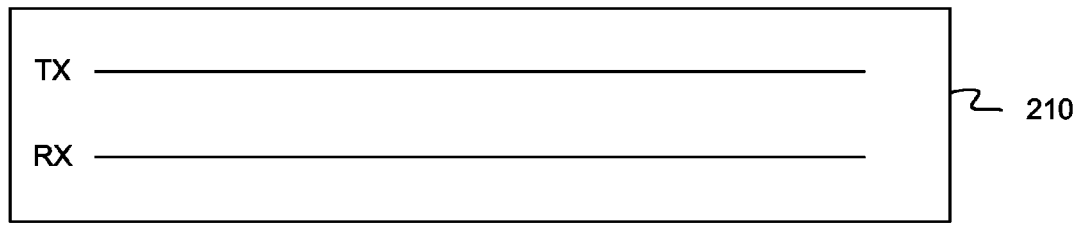
FIG. 2A is a block diagram illustrating a two wire proximity sensing antenna, according to an embodiment.

FIG. 2A is a block diagram illustrating a two wire proximity sensing antenna, according to an embodiment. Proximity sensing antenna 210 may be one example of proximity sensing antenna 114, as shown in FIG. 1. In one embodiment, proximity sensing antenna 210, includes two wires: a transmit (TX) wire and a receive (RX) wire. The transmit and receive wires may be metallic traces, electrodes, or formed from some other conductive material. The transmit wire in proximity sensing antenna 210 may be connected to transmit multiplexer 130 in order to receive transmit signal 135, and the receive wire may be connected to receive multiplexer 140 in order to provide receive signal 145 to processing device 120. Alternatively, the transmit and receive wires may be connected to other sources.

In one embodiment, the transmit and receive wires of proximity sensing antenna 210 may be substantially parallel to one another. The wires may be on the order of 10-20 centimeters (cm) long, spaced a distance of 3-6 cm apart, and may be approximately 0.5-1.5 millimeters (mm) thick. In other embodiments, the wires may have a different orientation, length, spacing, and/or thickness. In general, proximity sensing antenna 210 may be able to effectively sense proximity at a distance approximately equal to the length of the transmit and receive wires.

In one embodiment, the transmit wire of proximity sensing antenna 210 is driven with a transmit signal. This may cause an electric field (i.e., a mutual capacitance) to be formed between the transmit wire and the receive wire. A resulting signal can be read from the receive wire (e.g., by processing device 120). The presence of an object (e.g., the user's hand) near proximity sensing antenna 210 may alter or otherwise affect the capacitance between the transmit and receive wires, thereby causing a change in the signal read from the receive wire. In one embodiment, the change in the signal may be proportional to the distance that the object is from proximity sensing antenna 210. Directional sensing is generally not possible using a two wire proximity sensing antenna 210.

Figure 2B:
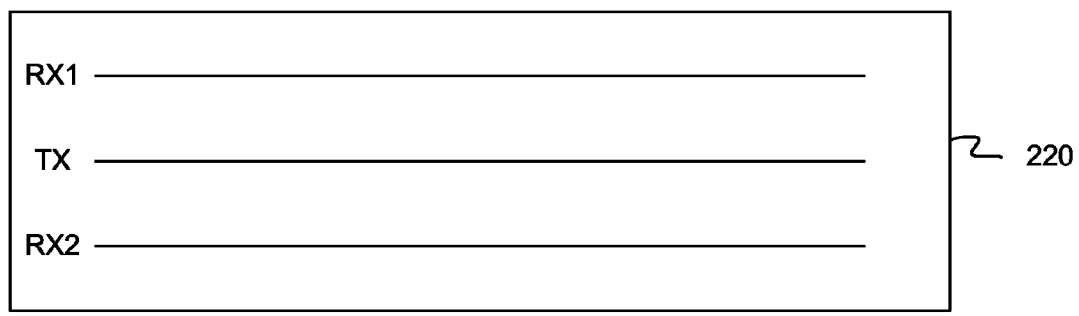
FIG. 2B is a block diagram illustrating a three wire proximity sensing antenna, according to an embodiment.

FIG. 2B is a block diagram illustrating a three wire proximity sensing antenna, according to an embodiment. Proximity sensing antenna 220 may be another example of proximity sensing antenna 114, as shown in FIG. 1. In one embodiment, proximity sensing antenna 220, has a similar construction to antenna 210, but includes three wires: a transmit wire TX, and two receive wires RX1 and RX2. The transmit and receive wires in proximity sensing antenna 220 may be similarly connected as those in antenna 210.

Figure 2C:
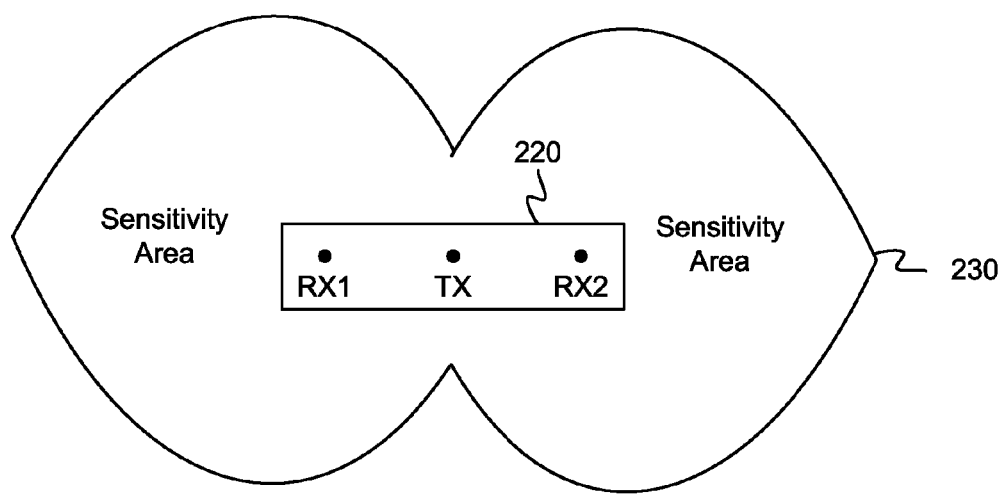
FIG. 2C is a diagram illustrating a sensitivity area of a three wire proximity sensing antenna, according to an embodiment.

In one embodiment, the transmit wire TX is driven with a transmit signal. This may cause an electric field (i.e., a mutual capacitance) to be formed between the transmit wire TX and each of the receive wires RX1 and RX2. A resulting signal can be read from each of the receive wires (e.g., by processing device 120). The presence of an object (e.g., the user's hand) near proximity sensing antenna 220 may alter or otherwise affect the capacitance between the transmit and receive wires, thereby causing a change in the signal read from each receive wire. The change in the signal for receive wire RX1 may be different than the change in the signal for receive wire RX2. This difference may be attributable to the position of the object. Processing device 120 may be configured to determine the position of the object based on the differences in the signals, and may be able to detect motion of the object by performing multiple readings over a period of time. Thus, directional sensing in at least one dimension may be possible using three wire proximity sensing antenna 220. A sensitivity area 230 is shown in FIG. 2C. FIG. 2C shows an end view of proximity sensing antenna 220 with the sensitivity area 230 radiating outward from each of receive wires RX1 and RX2.

Figure 3:
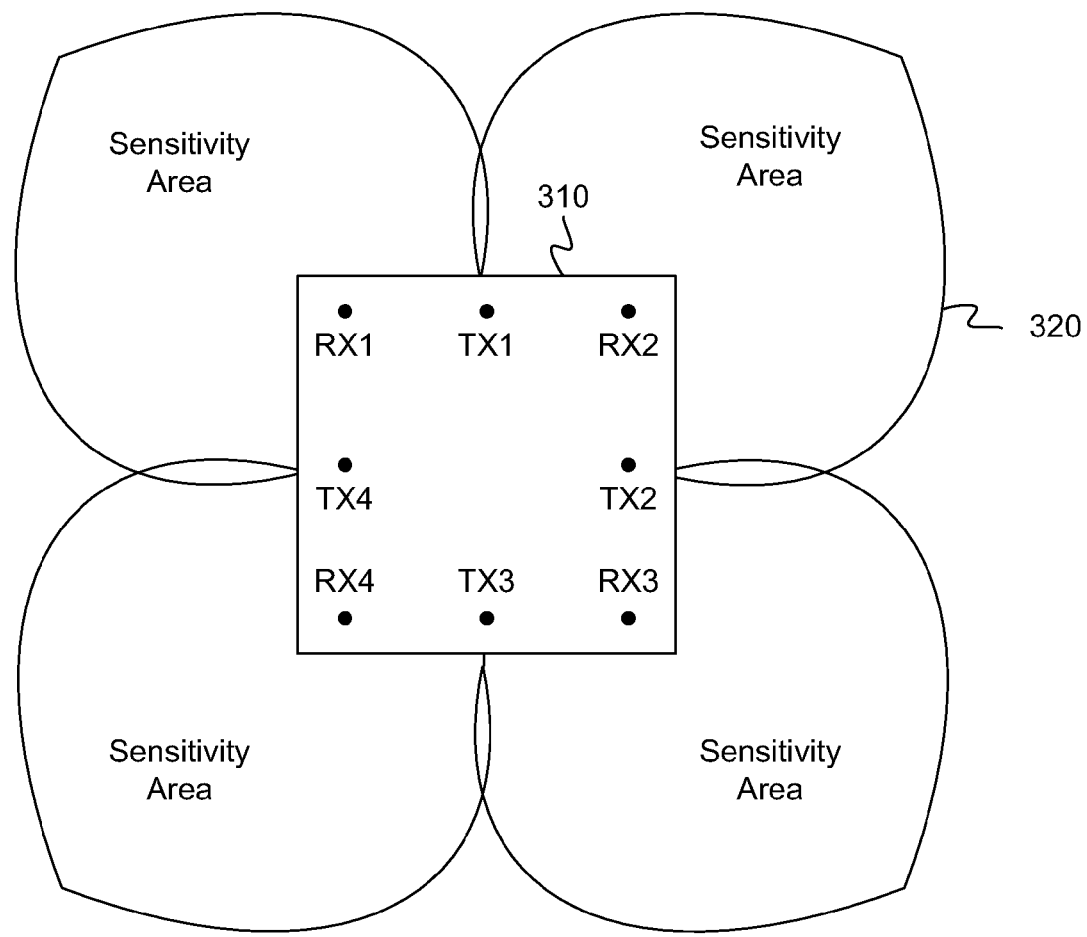
FIG. 3 is a diagram illustrating a sensitivity area of a multi-wire proximity sensing antenna, according to an embodiment.

FIG. 3 is a diagram illustrating a sensitivity area of a multi-wire proximity sensing antenna, according to an embodiment. In this embodiment, proximity sensing antenna 310 includes transmit wires TX1, TX2, TX3, TX4 and receive wires RX1, RX2, RX3, RX4. The wires may be asymmetrically arranged around proximity sensing device 310. When transmit wires TX1, TX2, TX3, TX4 are driven with a transmit signal, a mutual capacitance may be formed between each transmit wire and the adjacent receive wires. For example, TX1 may form a capacitance with RX1 and RX2, TX2 with RX2 and RX3, TX3 with RX3 and RX4, and TX4 with RX4 and RX1. With the increased number of transmit and receive wires, the sensitivity area 320 also increases. In one embodiment, based on the differences in measured signals on each of the receive wires RX1, RX2, RX3, RX4, proximity sensing antenna 310 may detect complex movements and/or gestures of an object (e.g., a user's hand) within sensitivity area 320. The illustrated antenna construction may provide proximity sensing in four directions, improved sensitivity as compared to a two-wire proximity detection antenna (e.g, 210), and optimal space utilization of the material used to form proximity sensing antenna 310, which may include printed circuit board (PCB) material or other material.

Figure 4A:
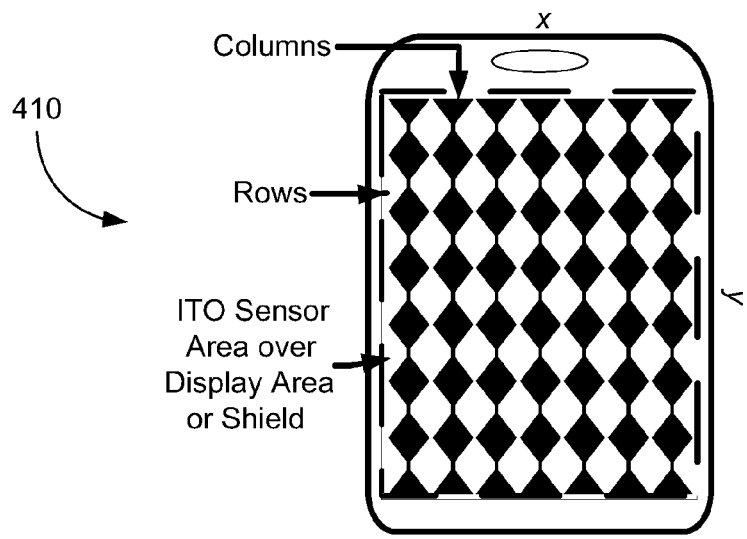
FIG. 4A is a diagram illustrating a capacitive sense array for implementing proximity sensing, according to an embodiment.

In other embodiments, rather than having a dedicated proximity sensing antenna, such as antenna 114, the existing capacitance sensors of a capacitive sense array, such as array 112, may be used to detect the proximity of an object. FIG. 4A is a diagram illustrating a capacitive sense array for implementing proximity sensing, according to an embodiment. Capacitive sense array 410 may be one example of capacitive sense array 112, as shown in FIG. 1. In one embodiment, capacitive sense array 410 may be part of a touch-sensing panel, a touch-screen display, or other touch-sensing device.

As shown, capacitive sense array 410 includes rows and columns of electrodes. The electrodes may be formed, for example, from transparent indium-tin-oxide (ITO) or other conductive material. In one embodiment, the ITO sensors may be positioned over a display area (e.g., in a touch-screen display) or shield area.

Figure 4B:
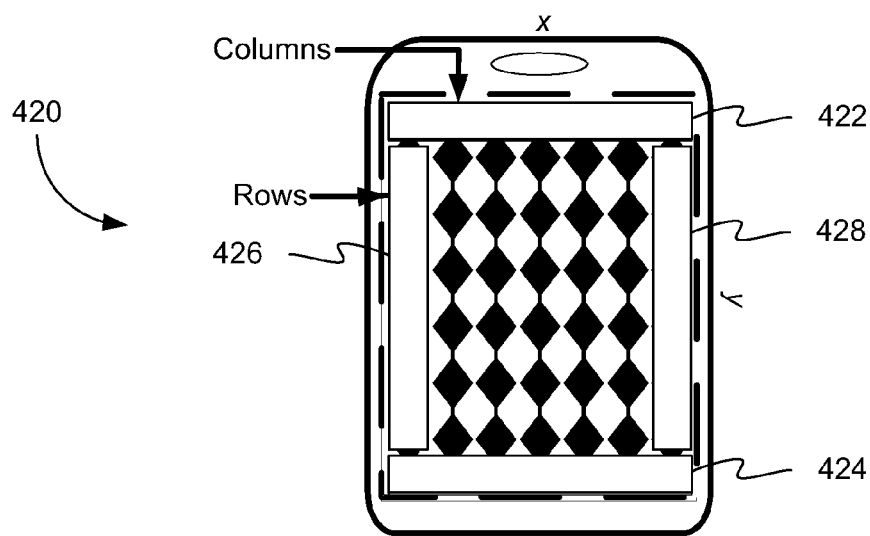
FIG. 4B is a diagram illustrating a capacitive sense array with defined proximity sensing regions, according to an embodiment.

FIG. 4B is a diagram illustrating a capacitive sense array with defined proximity sensing regions, according to an embodiment. Capacitive sense array 420 includes a number of defined proximity sensing regions. In one embodiment, there may be four proximity sensing regions: 422, 424, 426, and 428. The proximity sensing regions may be located around the outside edges of capacitive sense array 420 and may include, for example, the outermost rows and columns of electrodes. The electrodes included in the proximity sensing regions may be initially used to detect the proximity of an object to capacitive sense array 420 and subsequently repurposed to detect an actual touch by the object. This separation and orientation of proximity sensing regions 422, 424, 426, and 428 may allow a processing system to determine the position of an object in proximity to capacitive sense array 420 based on differences in measured signals. Multiple measurements over a period of time may also allow the detection of gestures made, for example, by a user's hand, over the surface of capacitive sense array 420. In another embodiment, the proximity sensing regions may include separate discrete sensors or antenna located outside of the capacitive sense array. There may be for example, four discrete sensors, where one is located adjacent and approximately parallel to an edge of the capacitive sense array. These discrete sensors may function similarly to proximity sensing regions 422, 424, 426, and 428 to detect the proximity of an object. In other embodiments, there may be some other number of discrete sensors or the sensors may be oriented differently with respect to the capacitive sense array.

Figure 4C:
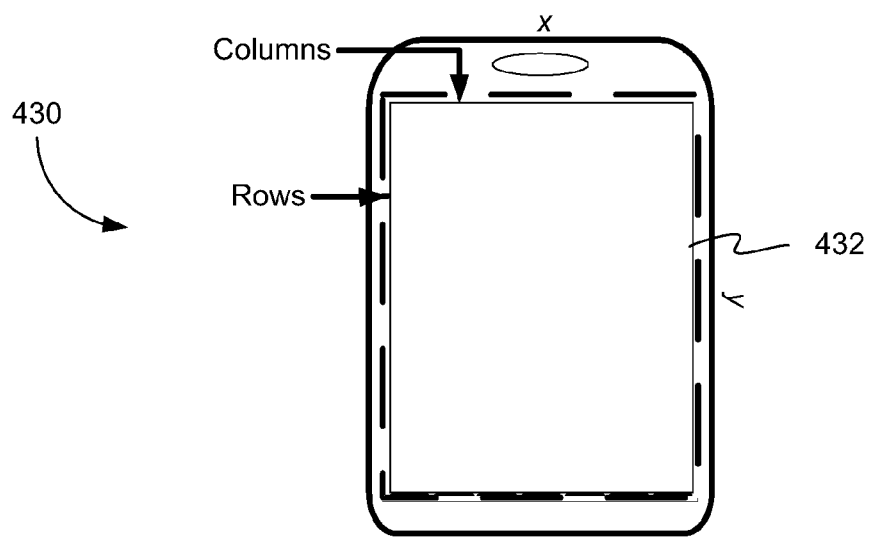
FIG. 4C is a diagram illustrating a capacitive sense array for proximity surface sensing, according to an embodiment.

FIG. 4C is a diagram illustrating a capacitive sense array for proximity surface sensing, according to an embodiment. In capacitive sense array 430, the proximity sensing region 432 may include the entire surface of capacitive sense array 430. Thus all of the electrodes in the array may be used to detect the proximity of an object. Using all of the electrodes may allow the processing system to detect more complex gestures with better accuracy, however, scanning the additional electrodes may take more time and use additional system resources.

Figure 5:
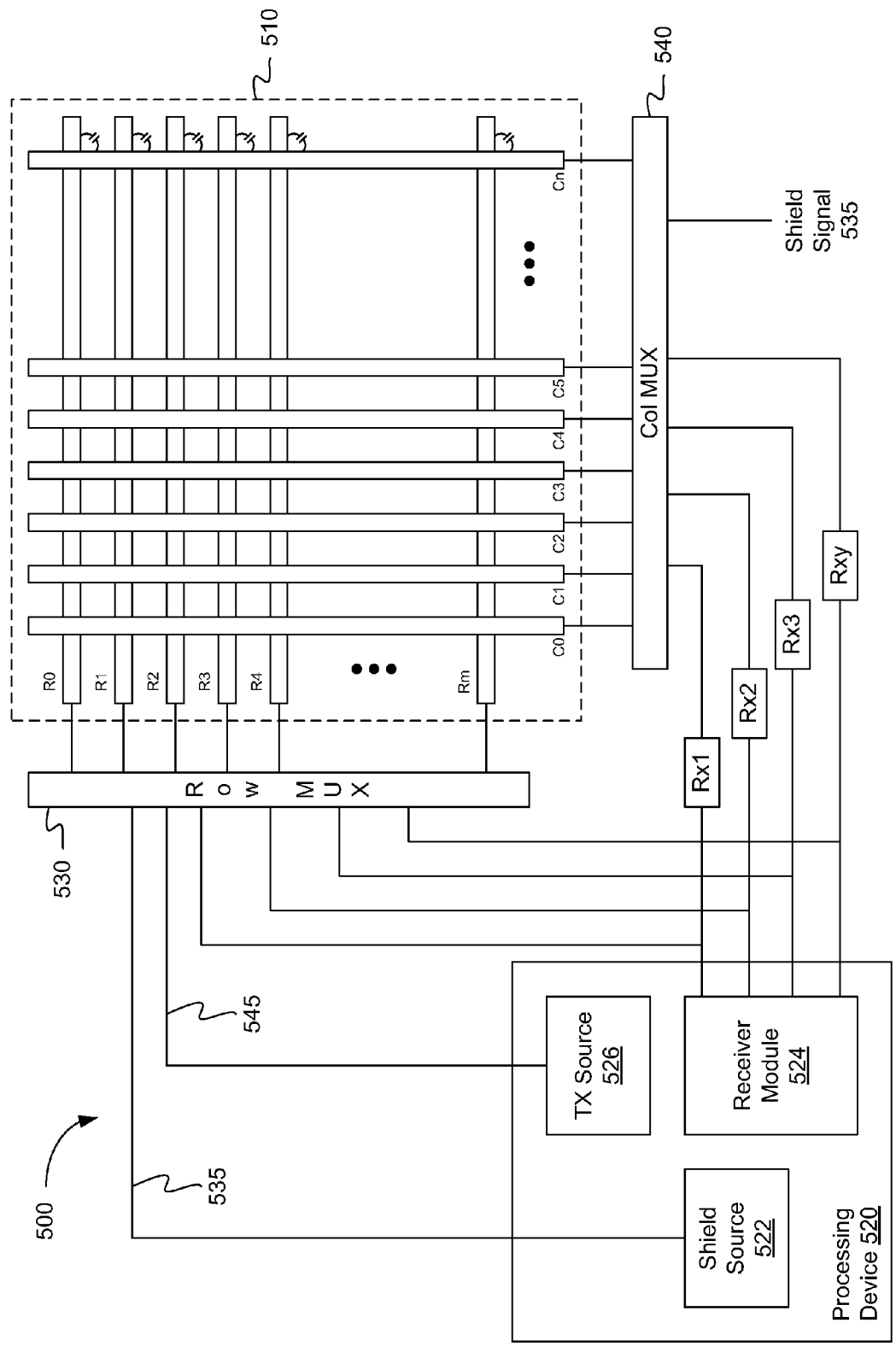
FIG. 5 is a block diagram illustrating a capacitance sensing system for proximity sensing, according to an embodiment.

FIG. 5 is a block diagram illustrating a capacitance sensing system, according to an embodiment of the present invention. In one embodiment, system 500 includes capacitive sense array 510, processing device 520, and multiplexers 530, 540. In capacitive sense array 510, individual row electrodes R0-Rm and column electrodes C0-Cn are shown. In different embodiments, there may be any number of row and column electrodes in capacitive sense array 510.

Each of row electrodes R0-Rm may be connected to row multiplexer 530, which may alternately apply shield signal 535 to row electrodes R0-Rm and provide measured signals from row electrodes R0-Rm to receive channel Rx1-Rxy of receiver module 524. Row multiplexer 530 may selectively apply shield signal 535 to, or measure signals on, one or more of row electrodes R0-Rm based on a control signal (not shown). The control signal may be received from processing device 520 or from some other source. In one embodiment, shield signal 535 is provided by shield source component 522 of processing device 520, however in other embodiments, shield signal 535 may be provided by some other source.

Each of column electrodes C0-Cn may be connected to column multiplexer 540, which controls the application of measured signals to processing device 520 and applies shield signal 535 to column electrodes C0-Cn, as appropriate. In one embodiment, processing device 520 includes receiver module 524. Receiver module 524 may have a number of receive channels Rx1, Rx2, Rx3, Rxy, each of which is configured to receive and process a measured signal from one of the row or column electrodes. In one embodiment there may be y receive channels equal to the greater of the number of row electrodes m or column electrodes n. In other embodiments, however, there may be some other number of receive channels. In certain embodiments the number of receive channels may be less than the number of row or column electrodes, thus preventing all electrodes from being measured at once. Row multiplexer 530 and column multiplexer 540 may selectively apply measured signals from the electrodes to the receive channels based on a control signal (not shown). The control signal may be received from processing device 520 or from some other source.

In one embodiment, row multiplexer 530 and column multiplexer 540 may be used to implement the mutual capacitance sensing techniques described above with respect to FIG. 1. In one embodiment, a transmit signal 545 from transmit (TX) source 526 is connected to row multiplexer 530 and applied to capacitive sense array 510. In other embodiments, however, system 500 may be used for proximity sensing, as described with respect to FIGS. 4A-4C. When used for proximity sensing, system 500 may be altered (e.g., switched to a different mode of operation) to use different capacitance sensing techniques. These techniques may be optimized for proximity sensing, as opposed to detecting an actual touch of capacitive sense array 510. The mode of operation may be controlled by processing device 520.

Capacitive sense array 510 may be configured for proximity sensing using proximity sensing regions, as described with respect to FIG. 4B. This may be described as a "proximity sensing mode." Using the previously described proximity sensing regions as an example, proximity sensing region 422 may include row electrode R0, proximity sensing region 424 may include row electrode Rm, proximity sensing region 426 may include column electrode C0, and proximity sensing region 428 may include column electrode Cn.

In the proximity sensing mode, electrodes R0, Rm, C0 and Cn may be configured to use a self-capacitance single electrode sensing technique. During self-capacitance single electrode sensing, all of the row and column electrodes have a same electrical potential. Thus, the resulting electrical field is not concentrated between intersecting row and column electrodes. The presence of an object (e.g., a user's hand) within a certain distance of capacitive sense array 510 creates a capacitance between the object and the electrodes. This affects an electronic signal corresponding to each electrode, which can be interpreted by the processing device 520 as the presence of an object. In one embodiment, during self-capacitance single electrode sensing, the row electrodes R0 and Rm that form the proximity sensing regions are measured first. The measured signal from each of electrodes R0 and Rm is routed, by row multiplexer 530 to available receive channels (e.g., Rx1 and Rx2) of receiver module 524. In order to eliminate the mutual capacitance formed between row electrodes R0, Rm and the column electrodes, column electrodes C0-Cn may be driven with shield signal 535 from shield source 522, through column multiplexer 540. Shield signal 535 may have a value equal to the potential of the receive channels to that the row electrodes and column electrodes are at a same potential during the scan. Any change in the measured signals from row electrodes R0 and Rm as compared to a previously measured baseline value can be used by processing device 520 to determine the presence of an object in proximity to capacitive sense array 510.

Subsequently, column electrodes C0 and Cn are measured. Column multiplexer 540 applies the measured signal from electrodes C0 and Cn to available receive channels of receiver module 524. At the same time, shield signal 535 is applied to row electrodes R0-Rm through row multiplexer 530. These measured signals can be used in conjunction with the signals from row electrodes R0 and Rm to determine the presence of an object in proximity to capacitive sense array 510. In other embodiments, the proximity sensing regions may include additional and/or different electrodes which may be scanned to determine the proximity of an object. Regardless of the region designations, scanning and measurement may occur in the same manner. If the number of electrodes to be scanned is greater than the number of available receive channels, the electrodes may be scanned sequentially until all electrodes in the designated region are completed. In addition, the electrodes may be scanned in a different order (e.g., column electrodes first, followed by row electrodes).

Another mode of operation for system 500 may be referred to as a "hover mode." In the hover mode, system 500 may be able to determine a precise location of a object in proximity to capacitive sense array 510 and identify gestures made by the object. In order to achieve these functions, in hover mode, system 500 may be configured to operate using a hybrid mutual and self capacitance single electrode technique ("hybrid technique"). The hybrid technique uses elements of both mutual capacitance sensing and self capacitance sensing in order to detect an object with greater accuracy. In the hybrid technique, one set of electrodes (e.g., row electrodes R0-Rm) have a higher potential than the other electrodes (e.g., column electrodes C0-Cn). Thus a mutual capacitance is formed between the columns and the rows, and during sensing an object affects the electric fields of both the columns and the rows resulting in a larger change in the measurement signals. This larger change makes it easier for the processing device 520 to determine the location and movement of the object as compared to either mutual or self capacitance sensing techniques alone.

The hover mode may also make use of the proximity sensing regions, as described with respect to FIG. 4B, including, for example, electrodes R0, Rm, C0 and Cn. In one embodiment, during hybrid sensing, the row electrodes R0 and Rm that form the proximity sensing regions are measured first. During measurement, column electrodes C0-Cn are driven with shield signal 535 through column multiplexer 540. In this embodiment, shield signal 535 may have a value that is higher than the potential at the receive channels. In addition, shield signal 535 may also have an inverse polarity as compared to the receive channels. This may create a mutual capacitance between row electrodes R0, Rm and column electrodes C0-Cn. The remaining row electrodes may also be driven with shield signal 535 through row multiplexer 530 to eliminate unwanted mutual capacitances. The measured signal from each of electrodes R0 and Rm is routed, by row multiplexer 530 to available receive channels (e.g., Rx1 and Rx2) of receiver module 524. Any change in the measured signals from row electrodes R0 and Rm as compared to a previously measured baseline value can be used by processing device 520 to determine the presence of an object in proximity to capacitive sense array 510. The presence of an object (e.g., a user's finger) near capacitive sense array 510 may increase the signal attributable to the self-capacitance of row electrodes R0 and Rm and decrease the signal attributable to the mutual capacitance between row electrodes R0, Rm and column electrodes C0-Cn. However, since the polarity of shield signal 535 is reversed, the net change in both signals will be in the same direction. This increased change makes it easier for processing device 520 to determine the location and movement of the object.

Subsequently, column electrodes C0 and Cn are measured. Column multiplexer 540 applies the measured signal from electrodes C0 and Cn to available receive channels of receiver module 524. At the same time, shield signal 535 is applied to row electrodes R0-Rm through row multiplexer 530. Again, shield signal 535 may have a potential value higher than the receive channels and with an opposite polarity. The measured signals from C0 and Cn can be used in conjunction with the signals from row electrodes R0 and Rm to determine the location of an object in proximity to capacitive sense array 510. In other embodiments, the proximity sensing regions may include additional and/or different electrodes which may be scanned to determine the proximity of an object. In addition, the electrodes may be scanned in a different order (e.g., column electrodes first, followed by row electrodes).

Figure 6:
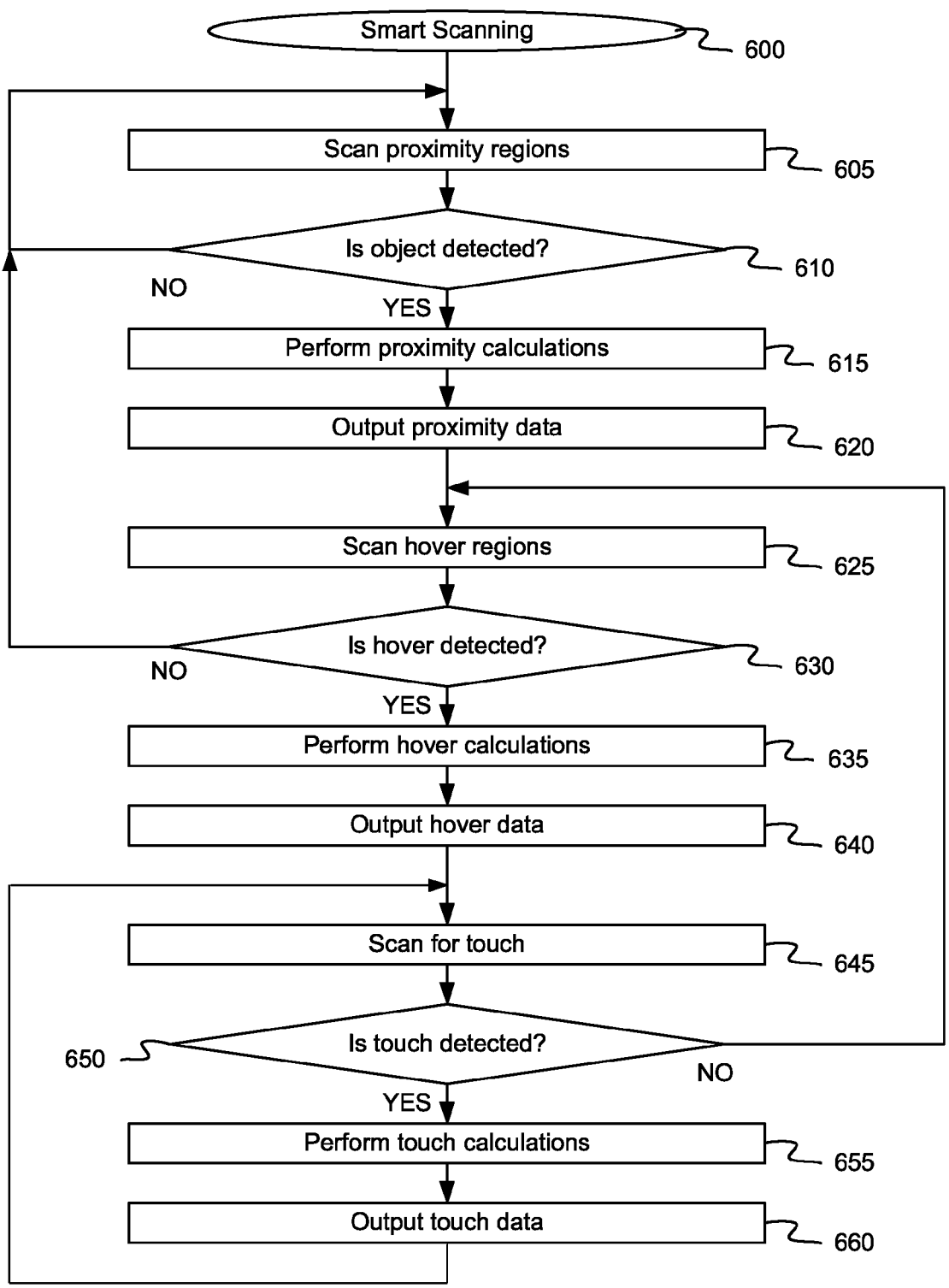
FIG. 6 is a flow diagram illustrating a proximity sensing method for a capacitive sense array, according to an embodiment.

FIG. 6 is a flow diagram illustrating a proximity sensing method for a capacitive sense array, according to an embodiment. The method 600 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to detect the presence of an object in proximity to a capacitive sense array and determine a location, movement, and/or gesture of the object. In one embodiment, method 600 may be performed by processing device 520, as shown in FIG. 5.

Referring to FIG. 6, at block 605, method 600 scans the designated proximity regions of a capacitive sense array, such as array 510. The proximity regions may be defined by processing device 520 and may include, for example, the outermost electrodes of the array 510, such as row electrodes R0 and Rm and column electrodes C0 and Cn. When scanning the proximity regions, processing device 520 may cause the system to use a self-capacitance single electrode sensing technique. Processing device 520 may alternately scan row electrodes R0 and Rm and column electrodes C0 and Cn while driving the other electrodes with shield signal 535. At block 610, method 600 determines if a touch object is detected in proximity to capacitive sense array 510. The measured signals from row electrodes R0 and Rm and column electrodes C0 and Cn may be compared to a previously measured baseline to determine the presence of an object. If a change in the signals is greater than a proximity threshold value, an object may be detected.

Figure 7:
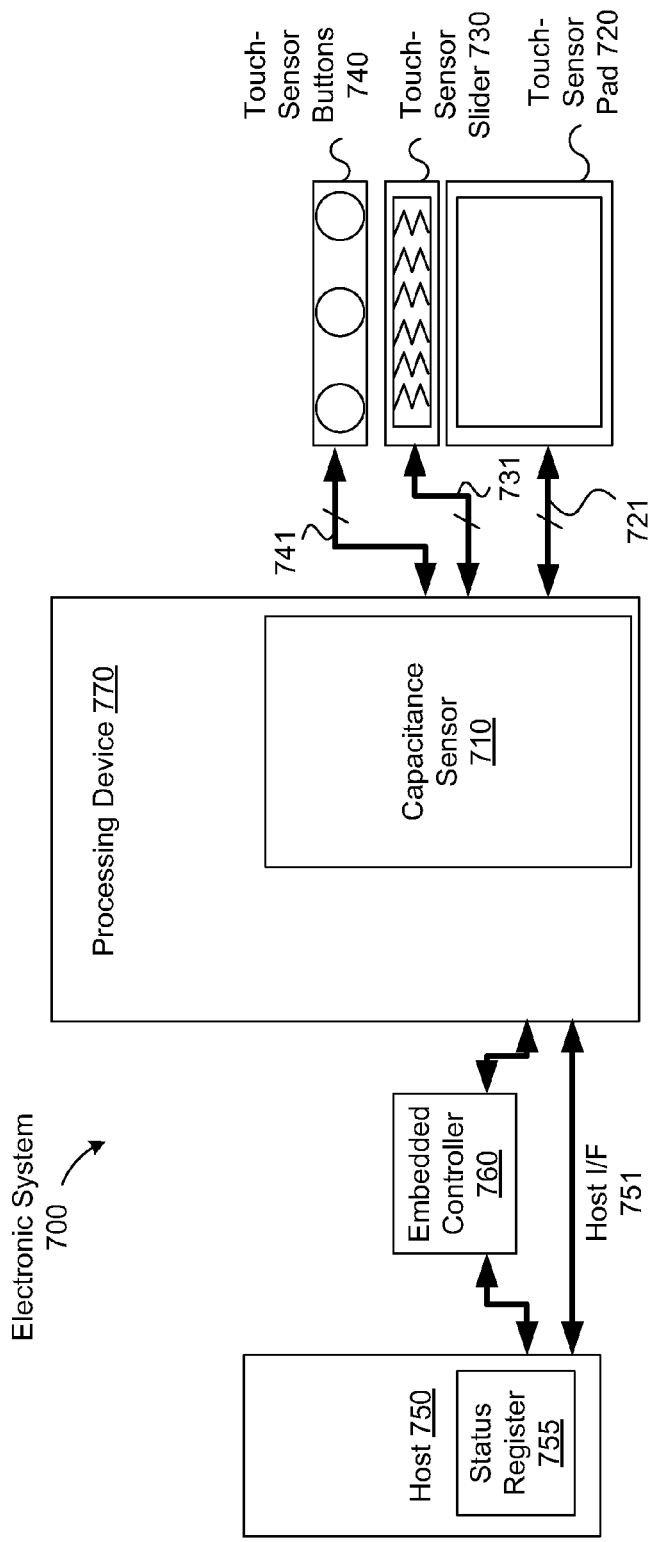
FIG. 7 is a block diagram illustrating an electronic system having a processing device for detecting a presence of a touch object, according to an embodiment.

If at block 610, method 600 determines that an object was not detected, method 600 returns to block 605. However, if method 600 determines that an object was detected, at block 615, method 600 performs proximity calculations. The proximity calculations may include calculating a proximity weight/distance signal or Z value, for defining proximity gestures. At block 620, method 600 outputs the calculated proximity data, for example, to a host machine, such as host machine 750, as shown in FIG. 7.

At block 625, method 600 scans the designated hover regions of capacitive sense array 510. In one embodiment, the hover regions may include the same electrodes as the proximity regions (i.e., row electrodes R0 and Rm and column electrodes C0 and Cn, and thus, the same electrodes are rescanned). When scanning the hover regions, processing device 520 may cause the system to use a hybrid sensing technique. Processing device 520 may alternately scan row electrodes R0 and Rm and column electrodes C0 and Cn while driving the other electrodes with shield signal 535. In one embodiment, shield signal 535 may have a potential value higher than the receive channels of processing device 520 and an opposite polarity. At block 630, method 600 determines if an object is detected hovering over capacitive sense array 510. The measured signals from row electrodes R0 and Rm and column electrodes C0 and Cn may be compared to one another to determine the location and movement of the object.

If at block 630, method 600 determines that an object is not hovering, method 600 returns to block 605. However, if method 600 determines that an object was hovering, at block 635, method 600 performs hover calculations. The hover calculations may including calculating a hover weight/distance signal or Z value, for defining hover gestures. At block 640, method 600 outputs the calculated hover data to host machine 750.

At block 645, method 600 scans capacitive sense array 510 to detect the touch of an object. When scanning the capacitive sense array 510, processing device 520 may cause the system to use a mutual capacitance sensing technique. Processing device 520 may sequentially drive a number of transmit (e.g., row) electrodes and measure the resulting signal on the receive (e.g., column) electrodes. The measured values may be stored in memory. The transmit and receive electrodes may include the same electrodes scanned at blocks 605 and 625 (thus those electrodes are rescanned) and/or different or additional electrodes. At block 650, method 600 determines if an object is touching capacitive sense array 510. The measured signals from the receive electrodes may be compared to a stored baseline value. If the differential value (i.e., the difference between the measured value and the baseline value) is greater than a predefined finger threshold value, then method 600 detects a touch.

If at block 650, method 600 determines that an object is not touching capacitive sense array 510, method 600 returns to block 625. However, if method 600 determines that an object is touching, at block 655, method 600 performs touch calculations. The touch calculations may include calculating a finger weight signal or Z value, calculating finger touch coordinates, defining finger gestures, large object rejection and/or other calculations. At block 660, method 600 outputs the calculated touch data to host machine 750.

FIG. 7 illustrates a block diagram of one embodiment of an electronic system having a processing device for detecting a presence of a touch object. Electronic system 700 includes processing device 770, touch-sensor pad 720, touch-sensor slider 730, touch-sensor buttons 740, host processor 750, and embedded controller 760. As illustrated, capacitance sensor 710 may be integrated into processing device 770. Capacitance sensor 710 may include analog I/O for coupling to an external component, such as touch-sensor pad 720, touch-sensor slider 730, touch-sensor buttons 740, and/or other devices. In one embodiment, processing device 770 may be representative of processing device 120 discussed above.

In one embodiment, the electronic system 700 includes touch-sensor pad 720 coupled to the processing device 770 via bus 721. Touch-sensor pad 720 may include one or more electrodes arranged to form a capacitive sense array such as array 110. For the touch-sensor pad 720, the one or more electrodes may be coupled together to detect a presence of a touch object over the entire surface of the sensing device. In one embodiment, touch-sensor pad 720 sends signals to processing device 770 representing capacitance measured by the capacitive sense array via bus 721. In an alternative embodiment, the electronic system 700 includes a touch-sensor slider 730 coupled to the processing device 770 via bus 731. In another embodiment, the electronic system 700 includes a touch-sensor buttons 740 coupled to the processing device 770 via bus 741.

The electronic system 700 may include any combination of one or more of the touch-sensor pad, a touch-sensor screen, a touch-sensor slider, and touch-sensor buttons. In one embodiment, buses 721, 731 and 741 may be a single bus. Alternatively, the bus may be configured into any combination of one or more separate signals or buses.

In one exemplary embodiment, processing device 770 may be the Programmable System on a Chip (PSoC®) processing device, developed by Cypress Semiconductor Corporation, San Jose, Calif. Alternatively, processing device 770 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Processing device 770 may communicate with an external component, such as a host processor 750, via host interface (I/F) line 751. In one embodiment, host processor 750 includes status register 755. In one example, if processing device 770 determines that a touch object is present on touch-sensor pad 720, processing device 770 sends instructions to update status register 755 to indicate the presence of the touch object. In an alternative embodiment, processing device 770 sends an interrupt request to host processor 750 via interface line 751.

It should also be noted that the embodiments described herein are not limited to having a configuration of a processing device coupled to a host, but may include a system that measures the equivalent capacitance on the sensing device and sends the raw data to a host computer where it is analyzed by an application. In effect the processing that is done by processing device 770 may also be done in the host. In another embodiment, the processing device 770 is the host.

It should be noted that the components of electronic system 700 may include all the components described above. Alternatively, electronic system 700 may include only some of the components described above, or include additional components not listed herein. It should also be noted that any one of various known methods for measuring capacitance may be used, for example relaxation oscillator methods, current versus voltage phase shift measurement, resistor-capacitor charge timing, capacitance bridge divider, charge transfer, successive approximation, sigma-delta modulation, charge-accumulation circuits, field effect, mutual capacitance, frequency shift, or the like.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method for detecting an object on a capacitance sensing array, the method comprising:
   in a first mode:
      configuring a capacitance sensing circuit to measure self capacitance,
      measuring a first self capacitance of a first electrode,
      measuring a second self capacitance of a second electrode,
      detecting, based on at least one of the first self capacitance of the second self capacitance, the object being proximate to a surface intermediate to the object and the first and second electrodes;
      responsive to detecting, configuring the capacitance sensing circuit to measure mutual capacitance of at least the first electrode and the second electrode;
      transmitting a transmit (TX) signal on the first electrode;
      receiving a receive (RX) signal on the second electrode, the RX signal responsive to a mutual capacitance between the first and second electrode; and
      calculating a position of the object proximate to, but not contacting, the substrate; and
   in a second mode:
      configuring the capacitance sensing circuit to measure mutual capacitance;
      transmitting a transmit (TX) signal on the first electrode;
      receiving a receive (RX) signal on the second electrode, the RX signal responsive to a mutual capacitance between the first and second electrode; and
      calculating a position of the object in physical contact with the substrate intermediate to the object and the first and second electrodes.

2. The method of claim 1, wherein the calculating the position of the object in the first mode comprises determining the position of the object relative to the capacitance sensing array when the object is proximate to and not in physical contact with the substrate.

3. The method of claim 1, wherein the first and second electrodes are disposed along the periphery of the capacitance sensing array.

4. The method of claim 1 further comprising, in the first mode, measuring a self capacitance of a plurality of additional electrodes representative of the entire capacitance sensing array.

5. The method of claim 1, further comprising, in the first mode, repeating the mutual capacitance measurement between a plurality of additional electrodes representative of the entire capacitance sensing array.

6. The method of claim 5, wherein, in the second mode, the mutual capacitance measurement between the first and second electrodes is repeated for each intersection between the first and second electrodes.

7. The method of claim 1, wherein the first and second electrodes are substantially perpendicular to each other.

8. The method of claim 1, further comprising:
   outputting the calculated position of the object proximate to a substrate intermediate to a conductive object and the first and second electrodes as a hover position
   outputting the calculated position of the object in physical contact with the substrate intermediate to the conductive object and the first and second electrodes as a touch position.

9. A method for detecting an object with a capacitance sensing array, the method comprising:
   when the object is proximate to but not in contact with a substrate intermediate to the sensing array and the object:
      measuring a change in self capacitance from the object on a plurality of capacitance sensing electrodes of the capacitance sensing array, the plurality of capacitance sensing electrodes including at least a first electrode and a second electrode, and
      responsive to measuring the change in self capacitance, measuring a change in mutual capacitance from the object between at least the first electrode and the second electrode of the plurality of capacitance sensing electrodes of the capacitance sensing array, and calculating the position of the object over the capacitance sensing array from the measured self capacitance and mutual capacitance; and when the object is in contact with the substrate intermediate to the sensing array and the object:

measuring a change in mutual capacitance from the object between the plurality of capacitance sensing electrodes of the capacitance sensing array, and calculating the position of the object on the capacitance sensing array from the measured mutual capacitance.

10. The method of claim 9, wherein the first and second electrodes are disposed along the periphery of the capacitance sensing array.

11. The method of claim 9 further comprising, when the object is proximate to but not in contact with a substrate intermediate to the sensing array and the object, measuring a change in self capacitance from the object on an additional plurality of capacitance sensing electrodes representative of the capacitance sensing array.

12. The method of claim 9 further comprising, when the conductive object is in contact with the substrate intermediate to the sensing array and the object, measuring the mutual capacitance of a plurality of additional electrodes representative of the entire capacitance sensing array.

13. The method of claim 9, wherein the first and second electrodes are substantially perpendicular to each other.

14. The method of claim 13, wherein, when the object is in contact with the substrate, the mutual capacitance measurement between the first and second electrodes is repeated for each intersection between the first and second electrodes.

15. The method of claim 9, further comprising:

outputting the calculated position of the object proximate to a substrate intermediate to the object and the first and second electrodes as a hover position outputting the calculated position of the object in physical contact with the substrate intermediate to the object and the first and second electrodes as a touch position.

16. A capacitance sensing device configurable to detect a presence of an object proximate to a substrate disposed over an array of capacitance sensing electrodes and to detect a presence of the object in contact with the substrate, the capacitance sensing device comprising:

a capacitance measurement circuit configured to:

measure a self capacitance of at least a first electrode and a second electrode of the plurality of electrodes, detect, based on at least the measured self capacitance, the object being proximate to a surface intermediate to the object and the plurality of electrodes, and responsive to the detection, measure a mutual capacitance between at least the first electrode and the second electrode of the plurality of electrodes; and processing logic configured to:

calculate a first position of the object based on the self capacitance and mutual capacitance of the plurality of electrodes when the object is proximate to but not contacting the substrate, and calculate a second position of the objected based on the mutual capacitance between at least the first electrode and the second electrode of the plurality of electrodes when the object is in contact with the substrate.

17. The capacitance sensing device of claim 16, wherein:
the first position is communicated to a host as a hover; and
the second position is communicated to the host as a touch.

18. The capacitance sensing device of claim 16, wherein the array of capacitance sensing electrodes is disposed over a display.

19. The capacitance sensing device of claim 16, wherein the capacitance measurement circuit is configured to:

drive a transmit (TX) signal on the first electrode; and receive a receive (RX) signal on the second electrode substantially perpendicular and capacitively coupled to the first electrode, the RX signal representative of the mutual capacitance between the first and second electrodes.

20. The capacitance sensing device of claim 16, wherein self capacitance is measured for a plurality of electrodes representative of the entire capacitance sensing array.

* * * * *